United States Patent [19]
Wilcox et al.

[11] Patent Number: 5,628,089
[45] Date of Patent: May 13, 1997

[54] RADIOTELEPHONE HAVING A SELF CONTAINED HINGE

[75] Inventors: Scott R. Wilcox, Palatine; Brian J. Hassemer, Gurnee; Stephen J. Gaynes, Wonder Lake, all of Ill.

[73] Assignee: Motorola, Inc., Schaumburg, Ill.

[21] Appl. No.: 444,356

[22] Filed: May 18, 1995

[51] Int. Cl.⁶ .................. E05F 1/10; H04M 1/00
[52] U.S. Cl. .................. 16/303; 16/277; 379/433
[58] Field of Search .................. 379/433, 434; 16/255, 256, 254, 278, 319, 277, 287, 288, 284, 293, 295, 303, 307

[56] References Cited

U.S. PATENT DOCUMENTS

| | | | |
|---|---|---|---|
| 165,619 | 7/1875 | Sanderson | 16/318 |
| 3,063,089 | 11/1962 | Greenman | 16/303 |
| 3,401,422 | 9/1968 | Ventura | 16/317 |
| 3,518,716 | 7/1970 | Larson | 16/50 |
| 3,564,643 | 2/1971 | Salée | 16/278 |
| 3,772,736 | 11/1973 | Hettich et al. | 16/288 |
| 4,215,449 | 8/1980 | Loikitz | 16/303 |
| 4,822,965 | 4/1989 | Hyogo et al. | 200/333 |
| 4,897,873 | 1/1990 | Beutler et al. | 379/433 |
| 5,040,268 | 8/1991 | Knürr | 16/261 |
| 5,185,790 | 2/1993 | Mischenko | 379/433 |
| 5,274,882 | 1/1994 | Persson | 16/303 |

FOREIGN PATENT DOCUMENTS

| | | | |
|---|---|---|---|
| 0406750A1 | 1/1991 | European Pat. Off. . | |
| 0445559 | 9/1991 | European Pat. Off. | 16/319 |
| 2439286 | 5/1980 | France . | |
| 2281099 | 2/1995 | United Kingdom . | |
| WO9318592 | 9/1993 | WIPO | H04B 1/08 |

*Primary Examiner*—M. Rachuba
*Assistant Examiner*—Donald M. Gurley
*Attorney, Agent, or Firm*—Donald C. Kordich

[57] ABSTRACT

A radio telephone (100) has a hinge (301) for joining a body (101) a cover (103) along an axis. The hinge (301) contains the axial force generated by an urging mechanism (403,404, 405) by locating the urging mechanism (403,404,405) in a can (303) and attaching a cap (305) to the can (303).

8 Claims, 7 Drawing Sheets

RADIOTELEPHONE HAVING A SELF CONTAINED HINGE

FIELD OF THE INVENTION

The present invention relates generally to the field of foldable, portable radiotelephones, and more particularly to apparatus for hinging the housings of a foldable, portable radiotelephone.

BACKGROUND OF THE INVENTION

Portable, cellular phones are increasingly utilized to permit a user to communicate telephonically over a wireless system at virtually any location. The portable telephone transmits a low wattage, radio frequency signal to a receiving station, which may be connected with conventional landline telephone systems.

Portable cellular radiotelephones having two housings joined by some type of hinge that allows the housings to fold upon one another are known in the art. Some known folding radiotelephones have most of the electronics in one housing, called the body. The other housing, called the cover, normally contains fewer electronic components than the body. Other known folding radiotelephones have all the electronics in the body; thus, the cover contains no electronics.

Figure 7:
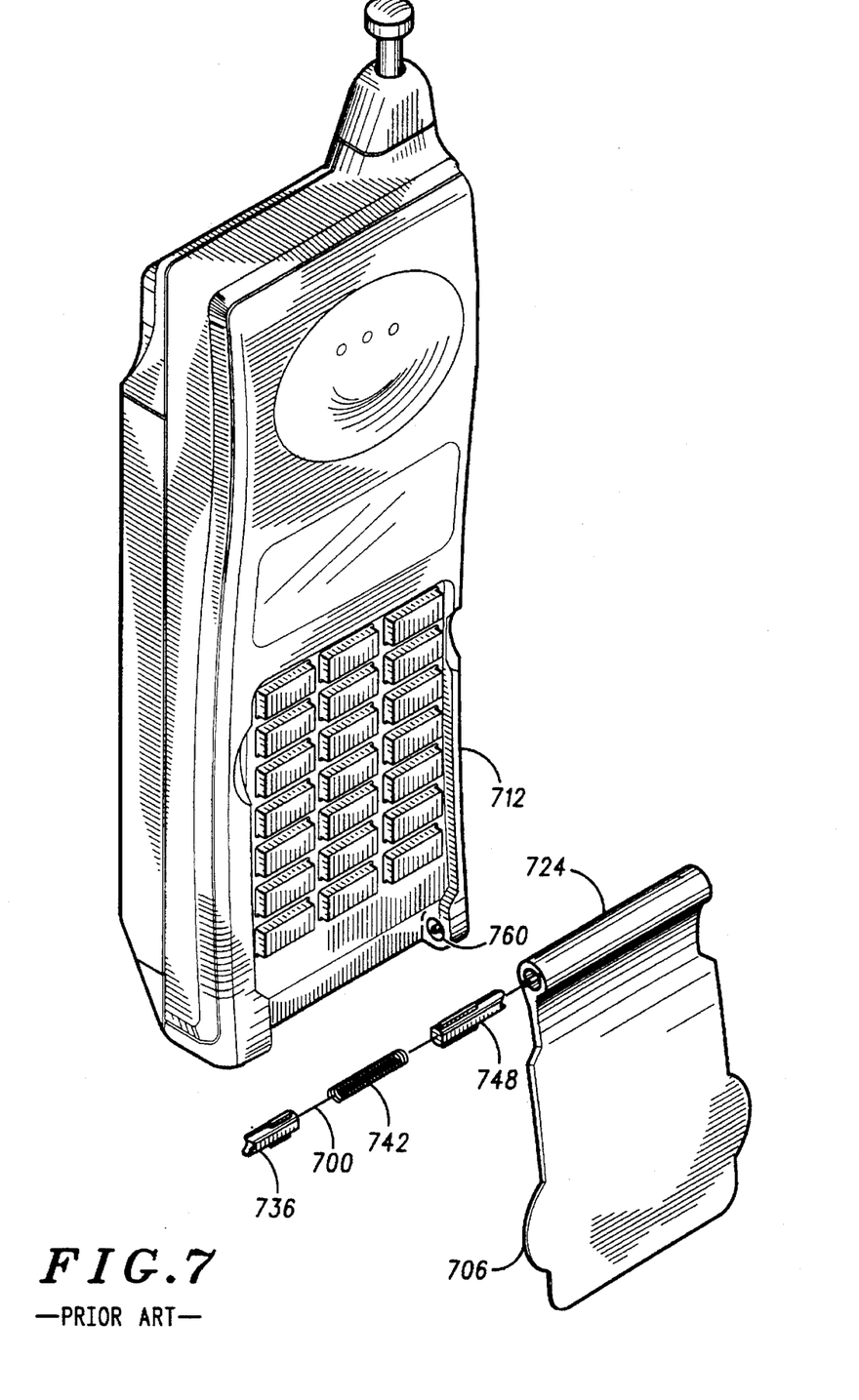
FIG. 7 is an exploded, perspective view of a known radiotelephone.

Some known portable cellular radiotelephones utilize, as shown in FIG. 7, a hinge mechanism having a spring 742 and hinge pins 736,748 disposed in a tubular hinge arm 724 formed at an end of a cover 706, and bushings 760 formed in body 712. Spring 742 is positioned between hinge pins 736, 748, and at all times outwardly forces hinge pins 736, 748 from cover 706 to body 712. Examples of such known radiotelephones are described in PCT Publication No. WO 93/18592, published Sep. 16, 1993 and U.S. Pat. No. 5,274,882, issued Jan. 4, 1994.

Although suitable for some foldable radiotelephones, such a hinge mechanism is not suitable for all foldable radiotelephones. The known foldable radiotelephones are relatively large and have sufficient bulk and material strength to bear the spring's outwardly directed compressive forces. Further, due to their relatively large housings, small hinge elements can be readily assembled in the radiotelephone housings. Increased miniaturization of foldable radiotelephones, however, leads to more flexible housings. Consequently, their housings can deform under the spring forces exerted by known hinge mechanisms. Furthermore, the smaller housings make it more difficult to assemble the hinge elements into the smaller radiotelephone housings.

A need therefore exists for an apparatus that joins the housings of miniaturized, foldable radiotelephones.

DESCRIPTION OF THE PREFERRED EMBODIMENT

The following detailed description is exemplary and explanatory only and is not restrictive of the invention as claimed. The accompanying drawings illustrate one embodiment of the invention and together with the description serve to explain the principles of the invention. Reference will now be made in detail to the present preferred embodiment of the invention.

Figures 1, 2:
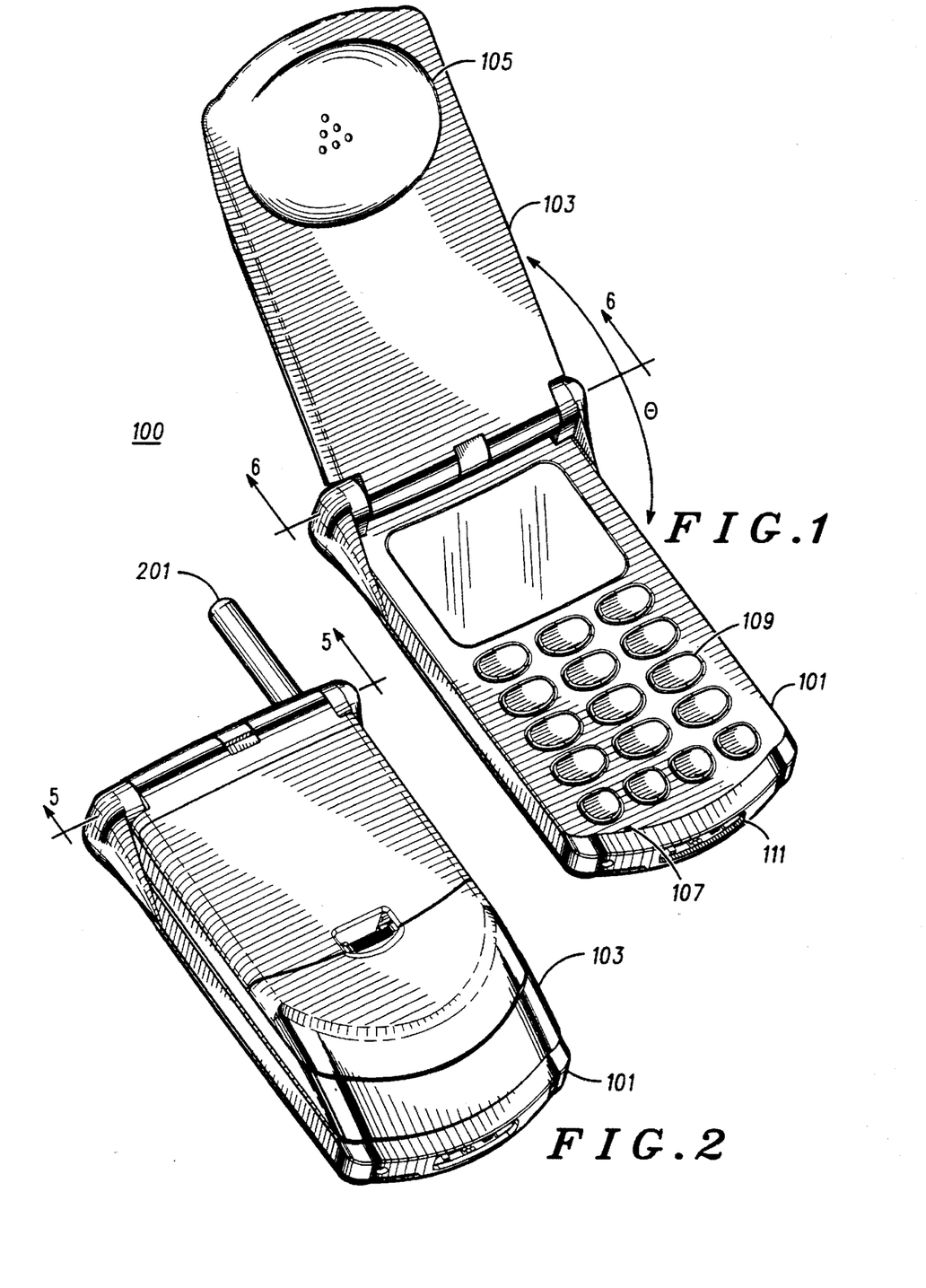
FIG. 1 is a perspective view of a radiotelephone in an open position configured in accordance with the invention.
FIG. 2 is a perspective view of the radiotelephone shown in FIG. 1 in a closed position configured in accordance with the invention.

The exemplary embodiment of a foldable, portable radiotelephone 100 of the present invention is shown in FIGS. 1 and 2. The portable radiotelephone 100 basically has two readily apparent portions, a body 101 and a cover 103. The drawing of FIG. 1 shows cover 103 in an "open" position such that a user of the radiotelephone 100 can listen via earpiece 105 and speak into microphone 107. The drawing of FIG. 2 shows cover 103 in a "closed" position. The body 101 includes a keypad 109 having a plurality of buttons numbered one through zero, #, and *, in a familiar telephone arrangement. The keypad 109 may also have additional buttons such as power, function, send, and other buttons associated with telephone number recall. The body 101 also has an antenna 201 that enables wireless communication between radiotelephone 100 and a base station (not shown) of the cellular radiotelephone system. The body 101 further includes a port 111 that allows radiotelephone 100 to connect with peripheral components, for example, a battery charger and external antenna, keypad, speaker, or microphone.

Figure 3:
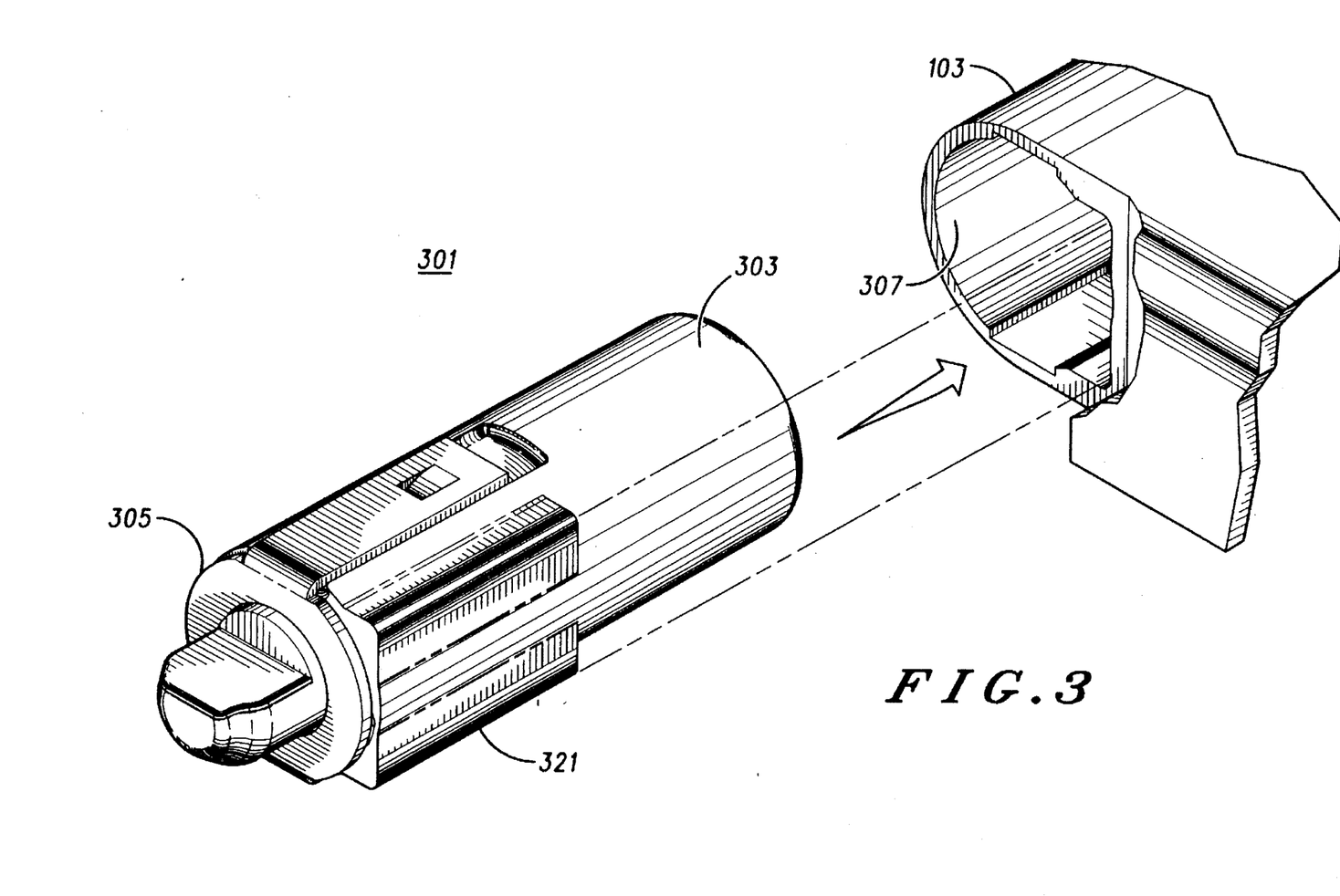
FIG. 3 is a perspective view of an assembled hinge configured in accordance with the invention.

As embodied herein and referring to FIG. 3, a hinge 301 joins cover 103 to body 101. Hinge 301, which is described in detail below, is shown fully assembled in the perspective view of FIG. 3 and exploded in the perspective view of FIG. 4. As shown in FIG. 5, which is a perspective cross sectional view of the closed radiotelephons 100 taken along the rotating axis, assembled hinge 301 is disposed in a cavity 307 of cover 103 and a cavity 503 of body 101. Hinge 301 disposed at one side of cover 103 holds cover 103 in the open or closed position. An idler shaft 505 is disposed at the opposite side of cover 103, in a cavity 507 of cover 103 and a cavity 509 of body 101.

Figure 5:
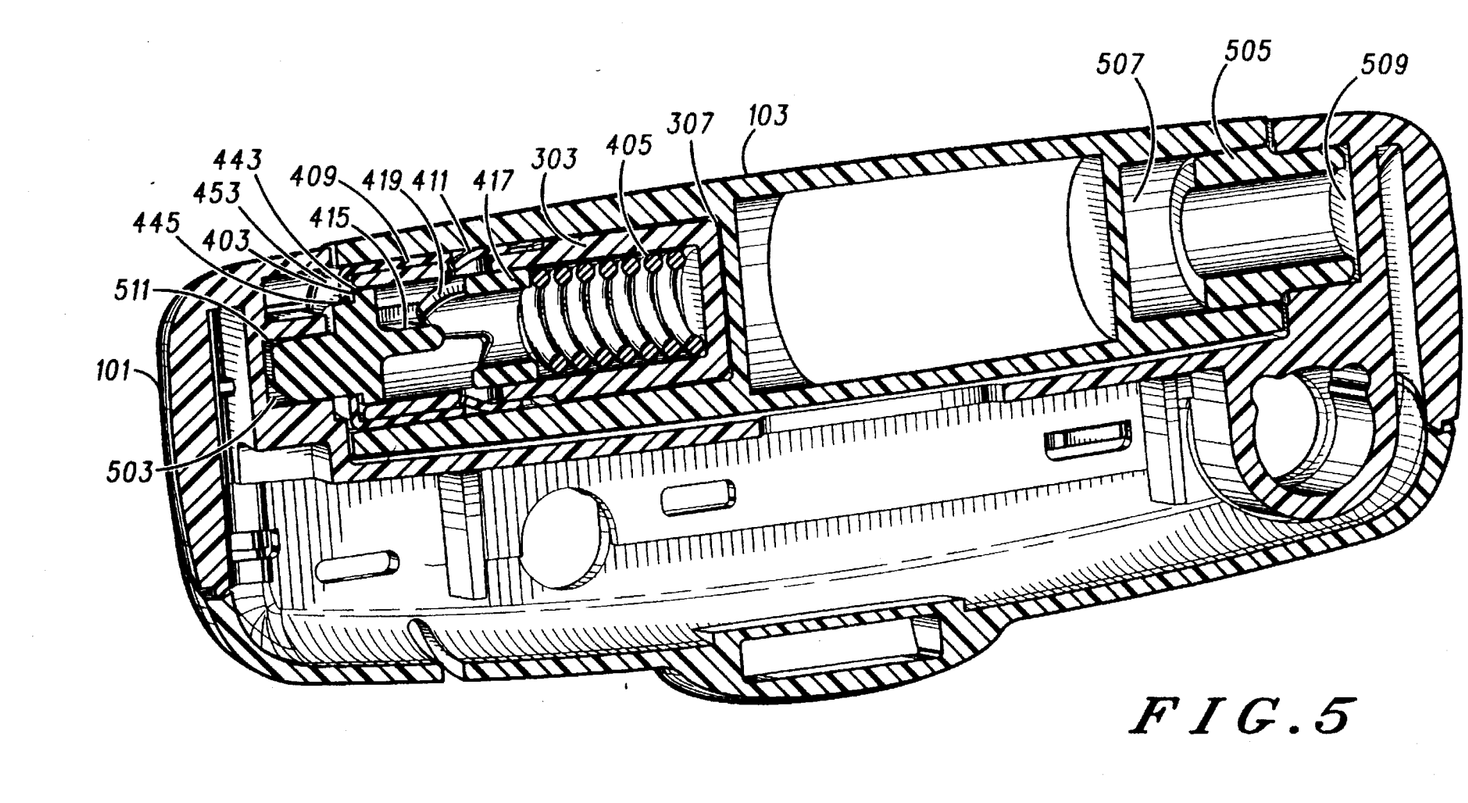
FIG. 5 is a perspective, cross sectional view of the radiotelephone illustrated in FIG. 2, taken along its rotating axis.
Figure 6:
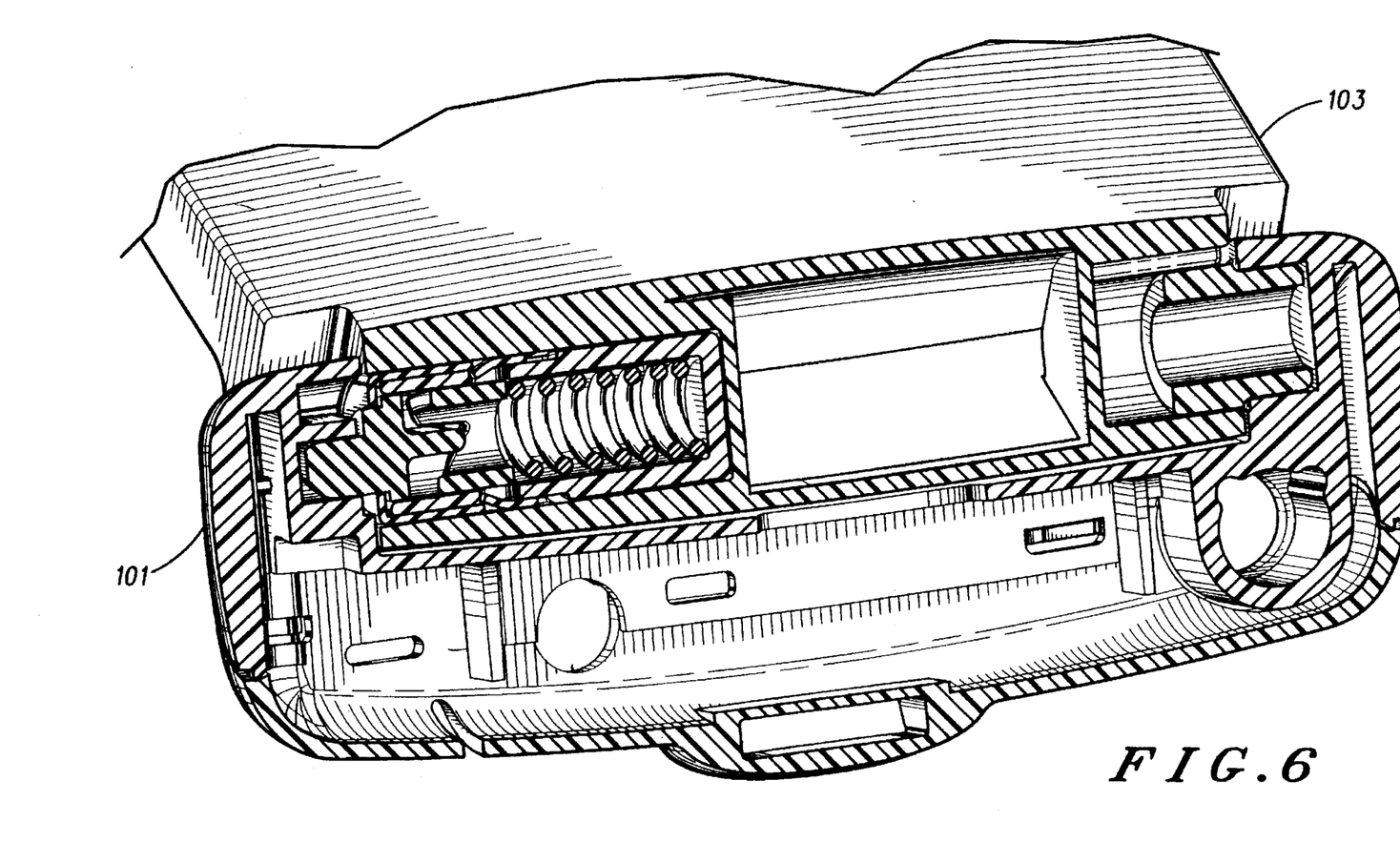
FIG. 6 is a perspective, cross sectional view of the radiotelephone illustrated in FIG. 1, taken along its rotating axis.

The design of hinge 301 allows cover 103 to be held against keypad 109 in the closed position, as shown in FIGS. 2 and 5, and at an obtuse angle for example, (Θ equals 148°) in the open position, as shown in FIGS. 1 and 6. Further, the design allows overtravel of cover 103 (for example, Θ equals 176°). Reference is made to PCT Publication No. WO 93/18592 for a more detailed understanding of the well understood prior art technique for urging cover 103 into or out of the open and closed positions during rotation of cover 103, and urging cover 103 to remain in the open or the closed position.

An advantage of the preferred embodiment of the present invention is that no axial forces are exerted on body 101 and cover 103 by hinge 301. This is achieved, as shown in FIG. 3, by partially locating the urging mechanism (described below) in a can 303 and attaching a cap 305 to the can 303 to secure the urging mechanism. Accordingly, hinge 301 is a self enclosed structure that contains the axially directed spring forces.

Another advantage of the preferred embodiment of the present invention is that the elements constituting hinge 301 can be assembled independent of the radiotelephone housings. After assembly of hinge 301, the assembled hinge 301—rather than tile individual components—is handled by assemblers when disposing hinge 301 in the radiotelephone housing.

The details of this invention are described below. The structure and assembly of hinge 301, cover 103, and body 101 of the preferred embodiment of the invention will now be described.

Figure 4:
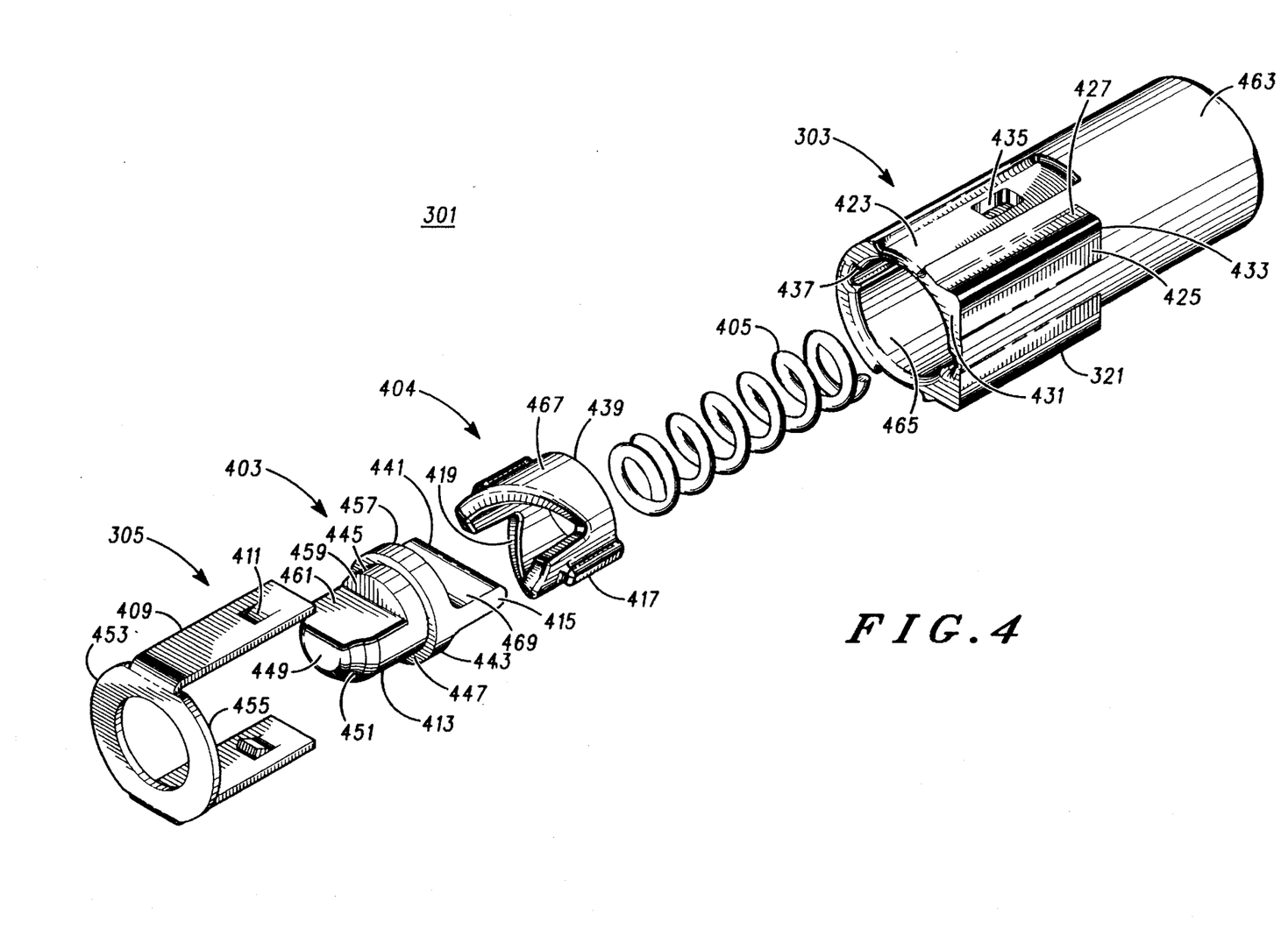
FIG. 4 is an exploded view of the hinge apparatus illustrated in FIG. 3.

As shown in FIG. 4, hinge 301 includes a can 303 composed of plastic material. Can 303 is generally cylindrically shaped, hollow, closed at one end, and open at the other end.

Can 303 includes a key 321 formed on an exterior surface 463 of can 303. Key 321 is rectilinear and begins at tile open end and extends approximately half the height of can 303. Key 321 has a flat surface 425 approximately intersecting surface 463 and has flat surfaces 427, 431, 433 extending from the sides of flat surface 427 to meet surface 463. As shown in FIG. 3, key 321 is used to align hinge 301 relative cover 103 when inserted into cavity 307, which is shaped to receive can 303, and rotatably affix can 303 to cover 103. Thus, when cover 103 is rotated, can 303 rotates along with it.

Slots 423 are formed in surface 463 and are generally rectangularly shaped. Slots 423 begin at the open end and extend approximately half the height of can 303. They are positioned diametrically opposite each other at 90° and 180° from a line that would be formed if flat surface 425 intersected surface 463. At approximately the middle of each slot 423, a hole 435 is formed that extends from surface 463 to an interior surface 465 of can 303.

Guides 437 are formed in surface 465 and are generally rectangularly shaped. They begin at the open end and extend approximately the full height of can 303. They are positioned diametrically opposite each other at 20° and 200° from a line that would be formed if flat surface 425 intersected surface 463.

Hinge 301 also includes the urging mechanism for urging cover 103 into or out of the open and closed positions during rotation of cover 103, and urging cover 103 to remain in the open or the closed position. The urging mechanism comprises a spring 405, a cam 404, and a cam follower 403 shown in FIG. 4, which generates an axial force and translates the axial force into a rotational force to urge the cover to remain in open and closed positions and, further, urges the cover into or out of open and closed positions during rotation of the cover.

Spring 405 is composed of metal and is spiral shaped, with an outer diameter less than the interior diameter of can 303. As shown in FIG. 5, spring 405 is located in can 303. Spring 405 can rotate and axially slide in can 303. Further, spring 405 has one end in rotatable contact with the interior surface of the closed end of can 303, and the other end in rotatable contact with one end of a cam 404. The inner diameter, length, and spring constant of spring 405 maintains suitable axially compressive forces on cam 404.

Cam 404 is composed of metal and is generally cylindrically shaped and hollow. The outer diameter of cam 404 is less than the interior diameter of can 303; thus, cam 404 can axially slide in can 303. One end is a flat ring surface 439 in rotatable contact with spring 405. The other end is shaped with a profile 419 in slideable contact with cam follower 403.

Cam 404 has rails 417 formed on its exterior surface 467. Rails 417 are generally rectangularly shaped and positioned diametrically opposed to each other. They begin at the edge of surface 439 and extend to a predetermined distance from profile surface 419. Rails 417 are in axially slidable contact with guides 437, thus guiding the axial movement of cam 404 inside can 303. Rails 417 and guides 437 of can 303 also align cam 404 relative can 303 and rotatably affix cam 404 to can 303. Thus, when can 303 rotates, cam 404 rotates along with it.

Cam follower 403 is composed of a single piece of solid metal. Cam follower 403 has four distinct integral portions: a tab 415, a mid-portion 443, a step 445, and a head 413.

Mid-portion 443 is generally disk-shaped and solid with a diameter less than the interior diameter of can 303. Consequently, mid-portion 443 can axially slide in can 303. Mid-portion 44.3 has a flat circular surface 447 at one end and a flat circular surface 457 all the other end.

Step 445 is generally disk-shaped with a diameter less than the diameter of mid-portion 443. One end of step 445 is contiguous and concentric to surface 447. The other end has a flat semicircular surface 449 contiguous to head 413.

Head 413 is generally cylindrically shaped with a diameter equal to the diameter of step 445, and with half the cylinder cut away to form a flat surface 461 perpendicular to surface 449. One flat, semicircular end of head 413 is contiguous to surface 449, anti the circumferences of head 413 and step 445 are aligned. The other end of head 413 has a gradually tapering surface 451 extending from the cylindrical surface of head 413 to a flat, semicircular surface 449 at the end of head 413.

As shown in FIG. 5, the tapered surface 451 aids in aligning hinge 301 into cavity 503 of body 101, which is shaped to receive head 413. Further, a flat inner wall 511 of cavity 503 and flat surface 461 act as keying elements to rotatably affix cam follower 403 to body 101.

Tab 415 is generally rectangularly shape. It is positioned contiguous and perpendicular to surface 457, and is aligned with and extends the width of the diameter of mid-portion 443. Tab 415 is oriented such that a flat surface 469 of tab 415 is parallel to surface 461. Tab 415 has a free end 441 that tapers to a rounded edge.

As shown in FIG. 5, tab 415 and mid-portion 443 are located in can 303. Interior surface 465 of can 303 is in rotatably, slidable contact with the edges of tab 415 and the circumferential surface of mid-portion 443. Further, end 441 of tab 415 is in slidable contact with profile 419 of cam 404.

Thus, when cover 103 is rotated, can 303 and cam 404 rotate with cover 103, and profile 419 rotatably slides on free end 441, which is axially fixed as described below. Further, as the cover 103 is rotated, the cam 404 moves axially in can 303, under the compressive force of spring 405, according to profile 419.

Hinge 301 finally includes a cap 305 composed of a single piece of metal as shown in FIG. 4. Cap 305 has a top 453 and two arms 409.

Top 453 is generally a flat ring with an inner diameter greater than the diameter of step 445 and an outer diameter approximately equal the diameter of can 303. Top 453 has a flat, ring-shaped surface 455.

Arms 409 are generally rectangularly shaped. One end of each arm 409 is attached to the edge of top 453, and each arm is perpendicular to surface 455. Arms 409 are positioned 180° from each other in opposing positions. Barbs 411, which are punched out of the metal constituting arms 409, are located near the other end of arms 409.

As shown in FIGS. 4 and 5, when hinge 301 is assembled, the inner diameter of top 453 is in rotatable, slideable contact with the circumference of step 445, arms 409 are located in slots 423 of can 303, and barbs 411 are latched into holes 435. The barbs and arms rotatably affix top 453 to can 303; consequently, the cap 305 rotates with the cover 103.

Importantly, barbs 411 latching into holes 435 also axially fixes cap 305 to can 303. Due to the interlocking structure of can 303 and cap 305, the axially directed force generated by the compressed spring 405 is borne by can 303 and cap 305. As shown in FIG. 5, when cap 305 is positioned on can 303, cap 305 axially fixes cam follower 403, via surface 455 placing an axially directed force on surface 447 of step 445. Thus, the cam follower 403 supported by cap 305 exerts a force in opposition to the spring 405 compressive force exerted on cam 404.

So configured, the embodiment provides numerous advantages over the prior art. For example, because hinge 301 contains the spring 405 compressive force within its own structure, no axially directed forces are exerted on the housing of radiotelephone 100. Further, because hinge 301 is self-contained, the small parts constituting hinge 301 can be assembled independent the housings, and the assembled hinge is simply inserted into the housing cavities. Thus, hinge 301 can be installed very quickly with little chance for assembly error.

Those skilled in the art will recognize that various modifications and variations can be made in the radiotelephone of the present invention and in construction of this radiotelephone without departing from the scope or spirit of this invention. As examples, another hinge 301 may replace the idler shaft 505, thus having two hinges to join cover 103 to body 101. Other types and configurations of urging mechanisms may be used to urge the cover. The elements of hinge 301 may be of any suitable materials, e.g., plastic or metal. The shape of the keying elements may be of other shapes suitable for aligning and affixing the elements. The locations of the keying elements may be varied provided the cooperation of the hinge elements produces the desired open and closed positions of the radiotelephone 100.

Figure 8:
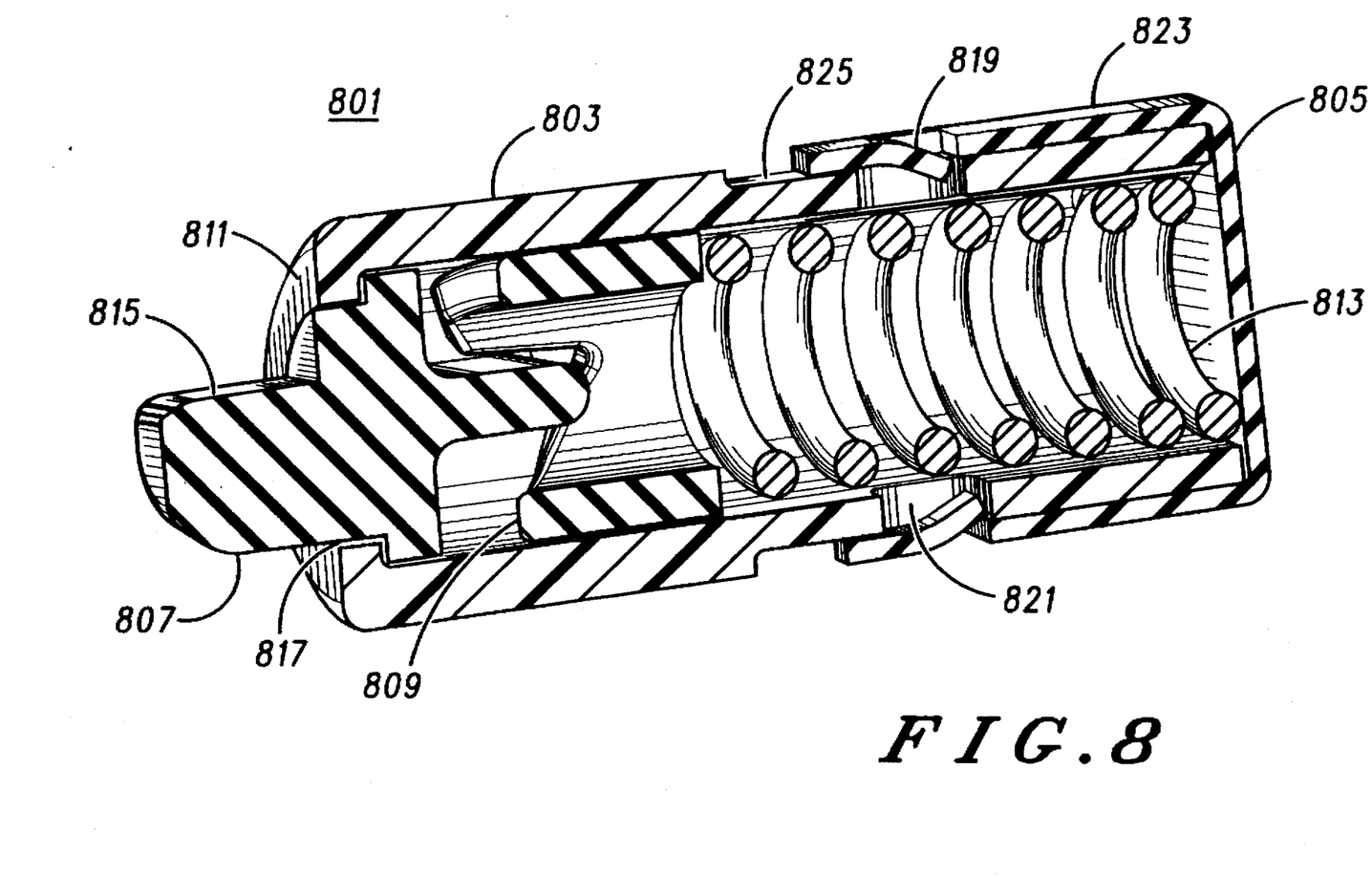
FIG. 8 is a perspective, cross sectional view of another assembled hinge configured in accordance with the invention.

Furthermore the hinge 301 of radiotelephone 100 may be substituted for a hinge 801 shown in FIG. 8. Hinge 801 comprises a can 803 having an open end and a partially closed end 811, a cap 805 attached to the open end, an urging mechanism including a cam follower 807 having an end located in can 803 and another end in contact with partially closed end 811, a cam 809 located in can 803, cam 809 having one end in contact with the cam follower's end, cam 809 further having another end, and a spring 813 located in can 803, one end of spring 813 in contact with the cam's another end, and another end of spring 813 in contact with cap 805. Spring 813 generates an axial force. Cam follower 807 is rotatably fixed to can 803 by the keying element formed by a flat surface 815 of cam 807 and an aperture 817 in partially closed end 811. Cap 805 is rotatably fixed to can 803 by barbs 819 latched into holes 821 and arms 823 located in slots 825. Importantly, barbs 819 latching into holes 821 also axially affixes cap 805 to can 803.

What is claimed is:

1. A hinge comprising:
   a can having an exterior surface, an open end, and an at least partially closed end, wherein the exterior surface with at least one hole formed therein;
   a cam follower including a first end within the can and a second end protruding through the at least partially closed end;
   a cam within the can, the cam including a first end in contact with the cam follower's first end, the cam further including a second end;
   means for rotatably fixing the cam to the can;
   a spring within the can, a first end of the spring in contact with the cam's second end; and
   a cap covering the open end and in contact with the second end of the spring, the cap including at least one arm and being detachably affixed to the exterior surface of the can by the at least one arm being latched into the at least one hole, thereby securing the cam follower, cam, and the spring within the can under compressive force of the spring.

2. A radiotelephone comprising:
   a body;
   a cover; and
   a hinge, coupled with the body and the cover, for joining the body and the cover along an axis, the hinge including,
      a can having an exterior surface, an open end, and an at least partially closed end;
      a cam follower including a first end within the can and a second end protruding through the at least partially closed end;
      a cam within the can, the cam including a first end in contact with the cam follower's first end, the cam further including a second end;
      means for rotatably fixing the cam to the can;
      a spring within the can, a first end of the spring in contact with the cam's second end; and
      a cap covering the open end and detachably affixed to the exterior surface of the can and in contact with the second end of the spring thereby securing the cam follower, cam, and the spring within the can under compressive force of the spring.

3. The radiotelephone of claim 2, wherein the can is adapted to fit into a cavity of the cover shaped to receive the can.

4. The radiotelephone of claim 2, wherein the cam follower further includes a second end adapted to fit into a cavity of the body shaped to receive the second end.

5. A hinge for joining a cover and a body of a radiotelephone, the hinge comprising:
   a can adapted to fit into a cavity of the cover shaped to receive the can, the can including an open end and an exterior surface with at least one hole formed therein;
   a cam follower, disposed in the open end, and including a head extending outside the can and adapted to fit into a cavity of the body shaped to receive the head;
   a cam within the can, the cam including a first end in contact with the cam follower's first end, the cam further including a second end;
   means for rotatably fixing the cam to the can;
   a spring within the can, a first end of the spring in contact with the cam's second end and a second end of the spring in contact with the at least partially closed end; and
   a cap covering the open end and including at least one arm and being detachably affixed to the exterior surface of the can by the at least one arm being latched into the at least one hole, the cap having an aperture formed therein, and the head protruding through the aperture into the body's cavity, the cap securing the cam follower, cam, and the spring within the can under compressive force of the spring.

6. A hinge for joining a cover and a body of a radiotelephone, the hinge comprising:

a can adapted to fit into a cavity of the cover shaped to receive the can, the can including a partially closed end and an open end and having an exterior surface with at least one hole formed therein;

a cam follower, disposed in the partially closed end, and including a head extending through the partially closed end and adapted to fit into a cavity of the body shaped to receive the head;

a cam within the can disposed adjacent the cam follower;

means for rotatably fixing the cam to the can;

a spring within the can disposed between the cam and the open end; end a cap covering the open end and including at least one arm and being detachably affixed to the exterior surface of the can by the at least one arm being latched into the at least one hole.

7. A hinge comprising:

a can having an exterior surface with at least one hole formed therein, an open end, and an at least partially closed end;

a cam follower including a first end within the can and a second end;

a cam within the can, the cam including a first end in contact with the cam follower's first end, the cam further including a second end;

means for rotatably fixing the cam to the can;

a spring within the can, a first end of the spring in contact with the cam's second end and a second end of the spring in contact with the at least partially closed end; and a cap having an aperture formed therein covering the open end and including at least one arm and being detachably affixed to the exterior surface of the can by the at least one arm being latched into the at least one hole, the second end of the cam follower protruding through the aperture, to secure the cam follower, cam, and the spring within the can under compressive force of the spring.

8. A radiotelephone comprising:

a body;

a cover; and a hinge, coupled with the body and the cover, for joining the body and the cover along an axis, the hinge including, a can having an exterior surface with at least one hole formed therein, an open end, and an at least partially closed end;

a cam follower including a first end within the can and a second end;

a cam within the can, the cam including a first end in contact with the cam follower's first end, the cam further including a second end;

means for rotatably fixing the cam to the can;

a spring within the can, a first end of the spring in contact with the cam's second end; and a second end of the spring in contact with the at least partially closed end; and a cap having an aperture formed therein covering the open end and including at least one arm and being detachably affixed to the exterior surface of the can by the at least one arm being latched into the at least one hole, the second end of the cam follower protruding through the aperture, to secure the cam follower, cam, and the spring within the can under compressive force of the spring.

* * * * *